United States Patent Office 3,658,865
Patented Apr. 25, 1972

3,658,865
PROCESS FOR THE ALKYLATION OF
ORGANOSILICON HALIDES
Georges Bakassian, Caluire, Gilbert Marin, Sainte-Foy-les-Lyon, and Marcel Lefort, Caluire, France, assignors to Rhone-Poulenc S.A., Paris, France
No Drawing. Filed June 30, 1970, Ser. No. 52,329
Claims priority, application France, July 1, 1969, 6922140
Int. Cl. C07f 7/02; C08f 11/04
U.S. Cl. 260—448.2 E          5 Claims

ABSTRACT OF THE DISCLOSURE

Compounds containing a silicon to chlorine bond are alkylated with a zinc alkyl in the presence of N-methyl pyrrolidone. These alkylated products are useful as monomers for producing rubbers, oils or organosilicon resins.

---

The present invention relates to a process for the alkylation of organosilicon compounds possessing chlorine-silicon bonds by reaction with an alkyl-zinc-compound.

The present invention provides a process for the alkylation of a compound containing a silicon to chlorine bond in which the compound is alkylated with a zinc alkyl in the presence of an N-hydrocarbyl substituted pyrrolidone.

The N-substituted pyrrolidones used in the invention may conform to the general formula:

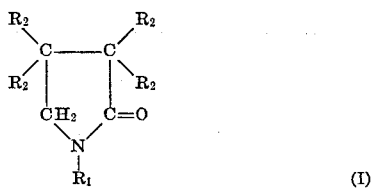

(I)

wherein $R_1$ represents a branched or unbranched alkyl radical having 1 to 6 carbon atoms, a cycloalkyl radical having 5 or 6 ring carbon atoms, an alkylphenyl radical or a phenylalkyl radical; and the symbols $R_2$, which may be the same or different, represent $R_1$ or a hydrogen atom.

It is preferred to carry out the process in the presence of N-methylpyrrolidone, since this N-alkylpyrrolidone is currently industrially the most accessible.

The N-substituted pyrrolidones of Formula I can be obtained by reductive amination of a succinic acid, which may or may not be alkylated, as described in French patent specification No. 1,439,192.

The zinc alkyl, in the form of a solution, can be obtained by reaction of an alkyl halide with zinc in a divided form, in a medium of a N-substituted pyrrolidone. In general, an alkyl halide having 1 to 12 carbon atoms is employed. The halides which can be used are the chlorides, bromides and iodides. For economic reasons, the chlorides are preferably used, although they are less reactive. When chlorides are used, an amount of iodine at least equal to 0.0005 atom, and preferably 0.001 to 0.02 atom, per atom of zinc is added to the reaction medium. The iodine is introduced either in the elementary form or in the form of an alkyl iodide.

In practice, the zinc alkyl may be prepared by successively introducing into a reactor zinc, preferably in the form of a coarse powder of average particle size about 0.2 mm., the N-substituted pyrrolidone and optionally a small amount of iodine or of an alkyl iodide, if the alkyl halide is a chloride. The reagents may then be heated to a temperature of between 10 and 200° and preferably between 50 and 150°, and the alkyl halide added whilst keeping the temperautre constant until the zinc has dissolved.

Included amongst the organosilicon compounds which can be alkylated in accordance with the process of the invention are:

(a) The organochlorosilanes of general formula:

$$R^3{}_{4-n}SiCl_n \qquad (II)$$

wherein the symbols $R^3$, which may be the same or different, represent hydrogen or an alkyl, cycloalkyl, alkenyl, cycloalkenyl, aryl, alkylaryl, aralkyl, alkoxy or cyclo-alkyl-oxy group, and $n=1$, 2, 3 or 4.

In Formula II, the alkyl radicals may have 1 to 6 carbon atoms, the alkenyl radicals may have 2 to 6 carbon atoms, the cycloalkyl radicals may have 5 to 6 ring carbon atoms and the aryl radical can be a phenyl radical.

Examples of such compounds which may be alkylated in accordance with the present invention are silicon tetrachloride, trimethylchlorosilane, tripropylchlorosilane, dimethylvinylchlorosilane, dimethylphenylchlorosilane, methyldiphenylchlorosilane, triphenylchlorosilane, dimethylchlorosilane, diphenyldichlorosilane, methylvinyldichlorosilane, methyltrichlorosilane, phenyltrichlorosilane, dimethylbutoxychlorosilane and dimethylcyclohexyloxychlorosilane.

(b) The organochloropolysilanes of general formula:

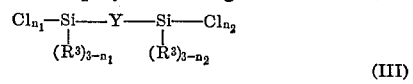

(III)

wherein $R^3$ is as defined in Formula II $n_1$ and $n_2$, which may be the same or different, equal 1, 2 or 3, and one of them can also be zero, and Y is a direct bond or a divalent radical which is inert towards the reagents used. If Y represents the divalent radical it may be a divalent, saturated or unsaturated, aliphatic, cycloaliphatic, aromatic or aralkyl hydrocarbon radical, for example, a substituted or unsubstituted polymethylene radical having 1 to 10 carbon atoms, a cycloalkylene radical containing 5 or 6 ring carbon atoms, a substituted or unsubstitued phenylene radical or a divalent radical containing hydrocarbon groupings bonded to one another by one or more hetero-atoms, such as oxygen or sulphur. Y may also represent a divalent atom such as oxygen.

Compounds of Formula III which may be alkylated in accordance with the present invention include 1,2-bis(dimethylchlorosilyl)ethane, p-bis(dimethylchlorosilyl)benzene, 4,4'-p-bis(methyldichlorosilyl)diphenylether, and 1,1,3,3-tetramethyl-1,3-dichloro disiloxane. A class of compound falling within Formula III which may be alkylated in accordance with this invention are organochloropolysiloxanes containing one or more chlorine atoms distributed in any manner whatsoever over the silicon atoms. Within this class of compounds, the α,ω-bis(organochlorosilyl)organopolysiloxanes of general formula:

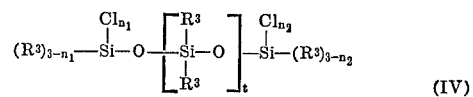

(IV)

wherein $n_1$, $n_2$ and $R^3$ are as defined above and $t$ has a value 1–500, are of particular interest. Examples of compounds of Formula IV, are 1,7-dichloro-octamethyltetrasiloxane, 1,11-dichloro-dodecamethylhexasiloxane or the α,ω-dichloro-organopolysiloxane oils.

The amounts of reagents used depend on the number of SiCl bonds to be alkylated, in the case of a silicon compound having several SiCl bonds. In principle, an amount of zinc alkyl corresponding to one molecule of alkyl halide would suffice to convert an Si—Cl bond into an Si—C bond. In practice, however rather more is used, normally 1–2 moles zinc alkyl per SiCl bond to be alkylated.

The amount of N-substituted pyrrolidone present is preferably such that there are at least two moles of pyrrolidone present for each alkylated SiCl bond. This amount is preferably between 2.5 and 5 mols, but it is possible to use a larger amount of N-substituted pyrrolidone without interfering with the course of the reaction.

The reaction generally takes place at a temperature of between 20 and 100° by adding the calculated amount of the organochlorosilicon compound to the solution of the zinc alkyl in the N-substituted pyrrolidone. The reaction is frequently completed by heating to a temperature above the temperature at which the organochlorosilicon compound is added.

When the reaction is finished, it is found that the liquid medium separates into two layers. The silicon compounds can either be recovered by simple decantation, which subsequently requires the small amounts of solvent contained in the organosilicon layer to be removed by distillation, or can be recovered by distillation. The N-substituted pyrrolidone, which is in the form of a complex, can be regenerated by a treatment wth a sodium hydroxide solution.

The alkylation process according to the invention makes it possible for a whole range of alkylated products to be obtained starting from chlorosilanes containing a large number of SiCl bonds, these alkylated products being used advantageously as monomers for producing rubbers, oils or organosilicon resins.

The examples which follow illustrate the invention. Temperatures are in ° C.

EXAMPLE 1

Zinc powder (1306 g.), N-methylpyrrolidone (3000 cc.) and iodine (20 g.) are introduced into a 10 litre flask equipped with a central stirrer, a dropping funnel and a condenser. The reagents are heated to 85° and methyl chloride is passed into the apparatus for 16 hours at the rate of 28 l./hour whilst keeping the temperature at 85°. Whilst passing in the methyl chloride, 2500 cc. of N-methylpyrrolidone are uniformly run in. It is then found that no further zinc remains in the reaction flask.

1396 g. of methylvinyldichlorosilane are placed in the dropping funnel and are run over the course of 3 hours, at 25°, into the previously prepared solution described above. The desired trimethyl vinylsilane is recovered by distillation under atmospheric pressure using a "Vigreux" column. A first fraction $F_1$ of 878 g. (boiling point $_{760}$:40–60°) contains 90% of trimethylvinylsilane, and a second fraction $F_2$ of 132 g. (boiling point $_{760}$:60–100°) contains 16.5 of trimethylvinylsilane. Pure trimethylvinylsilane is obtained in a yield of 80% by rectifying these two fractions.

EXAMPLE 2

A solution of an organo-zinc compound is prepared as in Example 1, from the following reagents:

zinc—65.3 g.
N-methylpyrrolidone—250 cc.
methyl chloride—51 g.
iodine—1 g.

The solution is brought to 60° and 203 g. of methylvinylbutoxychlorosilane are run this solution over the course of 3 hours. When the addition is complete, the mixture is kept at 60° for 1 hour 30 minutes and the reaction products are then subjected to distillation under reduced pressure. After distillation and rectification, a fraction of 100 g. of boiling point $_{38}$:56–59° is obtained, containing the dimethylvinylbutoxysilane in the pure state.

EXAMPLE 3

A solution of an organo-zinc compound is prepared as described in Example 2.

141 g. of methylvinyldichlorosilane and 200 cc. of N-methylpyrrolidone are placed in a flask and the previously prepared solution of organo-zinc compound is slowly run from a dropping funnel, whilst keeping the temperature of the mixture at about 25–30°. Distillation under atmospheric pressure yields the following fractions:

$F_1$=boiling point: 74–80°, 10 g. containing 79.6% of dimethylvinylchlorosilane.
$F_2$=boiling point: 80–82.5°, 87 g. containing 98.7 of dimethylvinylchlorosilane.

EXAMPLE 4

A solution of an organo-zinc compound is prepared as described in Example 1, but using:

zinc—653 g.
N-methylpyrrolidone—2500 cc.
methyl chloride—510 g.
iodine—10 g.

2553 g. of a mixture containing 2400 g. of diphenylchlorobutoxysilane, 58 g. of diphenyldichlorosilane and 95 g. of diphenyldibutoxysilane are run into this solution over 3 hours 15 minutes at 60°. The reaction products are recovered by decantation. The upper layer of 1895 g., containing the mixture of silicon-containing products and a little N-methylpyrrolidone, is first isolated. The lower layer is twice extracted with 500 cc. of cyclohexane and finally with 250 cc. of cyclohexane. The cyclohexane solution obtained (1482 g.) is added to the upper layer. The cyclohexane is removed under atmospheric pressure, the N-methylpyrrolidone is then removed under a pressure of 20 mm. of mercury, and the methyldiphenylbutoxysilane is distilled. A fraction of 1779 g., having a boiling point 0.3:110–116°, and containing 99.6% of methyldiphenylbutoxysilane is thus obtained.

EXAMPLE 5

A solution of an organo-zinc compound is prepared as described in Example 1, but using:

zinc—65.3 g.
N-methylpyrrolidone—250 cc.
n-propyl chloride—78.5 g.
iodine—2 g.

96 g. of dimethylvinylchlorosilane are run into this solution over 30 minutes at 90°, and the mixture is then kept at this temperature for 5 hours 30 minutes. On distillation under atmospheric pressure, a fraction of 91 g. of boiling point: 65–93°, containing 21% of dimethylvinylpropylsilane, is recovered.

EXAMPLE 6

A solution of an organo-zinc compound is prepared as described in Example 1, but using:

zinc—1306 g.
N-methylpyrrolidone—5000 cc.
iodine—23 g.
methyl chloride—1240 g.

2720 g. of dimethyl-(chloromethyl)-chlorosilane are then run into this solution in 5 hours at 30–32°. Distillation under atmospheric pressure yields a fraction of 2141 g. of pure trimethyl-(chloromethyl)-silane, of boiling point: 99–100°.

EXAMPLE 7

A solution of an organo-zinc compound is prepared as described in Example 1, but using:

zinc—65.3 g.
N-methylpyrrolidone—250 cc.
methyl chloride—51 g.
iodine—1 g.

173.5 g. of pentamethylchlorodisiloxane are then run into this solution over 40 minutes at about 30°. When the addition is finished, the reagents are heated to 100° for 1 hour and the reaction products then separated by decantation. The upper layer (140 g.) contains the silicon-containing products. Water is added to the lower layer, which separates into two layers. The upper layer thus obtained (7 g.) is removed and added to the silicon-containing products. The fraction is analysed by chromatography which shows that it contains:

| | Percent |
|---|---|
| Hexamethyldisiloxane | 92.4 |
| Pentamethylchlorodisiloxane | 1.9 |
| N-methylpyrrolidone | 5.7 |

EXAMPLE 8

A solution of ethyl-zinc bromide is prepared from the following reagents:

ethyl bromide—381.5 g.
zinc—229 g.
N-methylpyrrolidone—945 cc.

The reagents are heated under reflux for 8 hours. 511 g. of dimethylphenylchlorosilane are then run into the solution so obtained over 45 minutes at 75–80°, and the reaction mixture is then heated to 130° for 2 hours.

The reaction product is recovered by decantation. The upper layer (240 g.) which contains the silicon-containing products and a little N-methylpyrrolidone is treated with 2 portions of 150 cc. of water. After again decanting, the layer of the organosilicon compounds is reduced to 185 g. by removal of the N-methylpyrrolidone. The lower layer of the reaction products is treated with 2 portions of 500 cc. of water, which, allows 262 g. of silicon-containing products to be recovered by decantation.

The silicon-containing products are combined to give a fraction containing 70% of dimethylethylphenylsilane.

Rectification yields 215 g. of pure dimethylethylphenylsilane (boiling point 20:89–93°).

EXAMPLE 9

A solution of an organo-zinc compound is prepared as described in Example 1, but using:

zinc—65.3 g.
N-methylpyrrolidone—250 cc.
iodine—1 g.
methyl chloride—51 g.

94.5 g. of dimethylchlorosilane are run in over the course of three hours whilst keeping the organo-zinc solution at 25°. The resulting trimethylsilane is directly recovered in a trap cooled to —80° and 67 g. of a mixture containing 49 g. of trimethylsilane are recovered.

We claim:
1. A process for the alkylation of a compound containing a silicon to chlorine bond which has the general formula:

$$(R^3)_{4-n}SiCl_n$$

wherein the symbols $R^3$, which may be the same or different, represent hydrogen or an alkyl, cycloalkyl, alkenyl, cycloalkenyl, aryl alkaryl, aralkyl, alkoxy or cycloalkyl-oxy group and $n=1, 2, 3$ or 4, or the general formula:

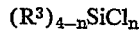

wherein the symbols $R^3$, which may be the same or different, represent hydrogen or an alkyl, cycloalkyl, alkenyl, cycloalkenyl, aryl, alkaryl, aralkyl, alkoxy or cycloalkyl-oxy group and $n=1, 2, 3$ or 4, $n_1$ and $n_2=1, 2$ or 3 or one of $n_1$ and $n_2=0$ and Y is a direct bond or a divalent radical inert towards the reagents used, in which the compound containing the silicon chlorine bond is alkylated with a zinc alkyl in the presence of an N-hydrocarbyl substituted pyrrolidone of the general formula:

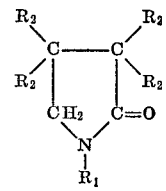

wherein $R_1$ represents a branched or unbranched alkyl radical having 1 to 6 carbon atoms, a cycloalkyl radical having 5 or 6 ring carbon atoms, an alkylphenyl radical or a phenylalkyl radical, and the symbols $R_2$, which may be the same or different, represent $R_1$ or hydrogen.

2. A process according to claim 1 wherein the pyrrolidone is N-methyl pyrrolidone.

3. A process according to claim 1 wherein there are at least 2 moles of the pyrrolidone present for each silicon-chlorine bond to be alkylated.

4. A process according to claim 3 wherein there are 2.5 to 5.0 moles of the pyrrolidone present for each silicon-chlorine bond to be alkylated.

5. A process according to claim 1 wherein the compound to be alkylated is an α-ω-bis(organo-chlorosilyl) organopolysiloxane of the general formula:

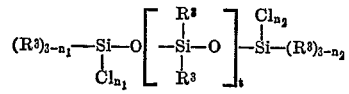

where $R^3$, $n_1$ and $n_2$ are as defined in claim 1 and $t$ has a value 1–500.

References Cited

UNITED STATES PATENTS

| 2,403,370 | 7/1946 | Hurd | 260—448.2 E |
| 3,414,595 | 12/1968 | Oakes | 260—429.7 |
| 3,475,472 | 10/1969 | Suzuki et al. | 260—429.7 |

TOBIAS E. LEVOW, Primary Examiner

W. F. W. BELLAMY, Assistant Examiner

U.S. Cl. X.R.

260—46.5 G